No. 891,394. PATENTED JUNE 23, 1908.
H. H. BENSON.
INTERNAL COMBUSTION ENGINE.
APPLICATION FILED APR. 15, 1907.

6 SHEETS—SHEET 3.

Witnesses
G. A. Tauberschmidt
George L. Chindahl

Inventor
Harry H. Benson,
By N. H. Wommack,
Atty

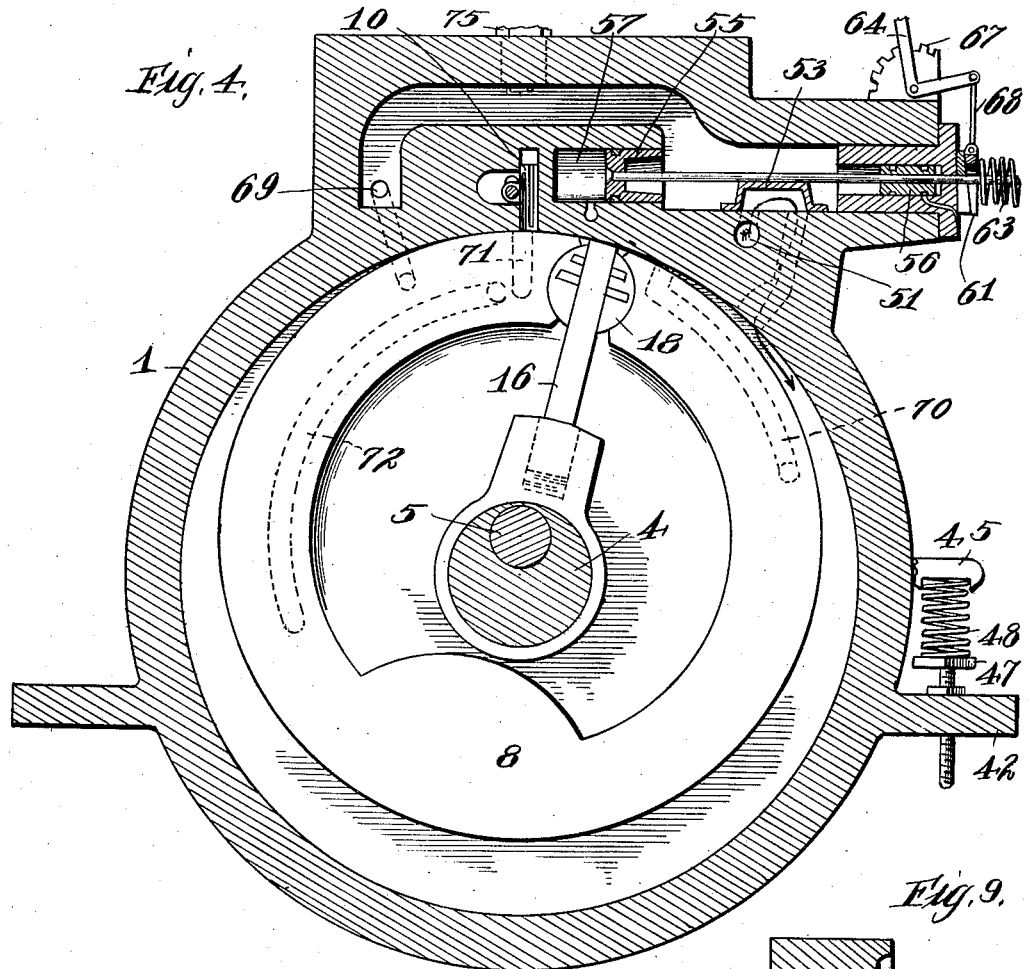
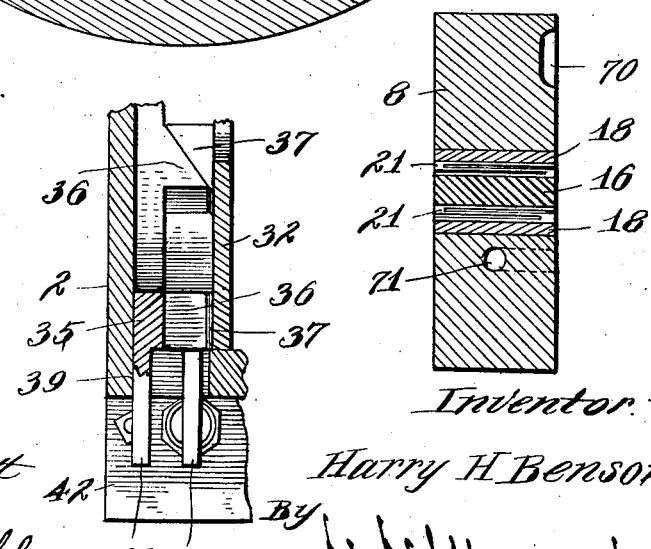

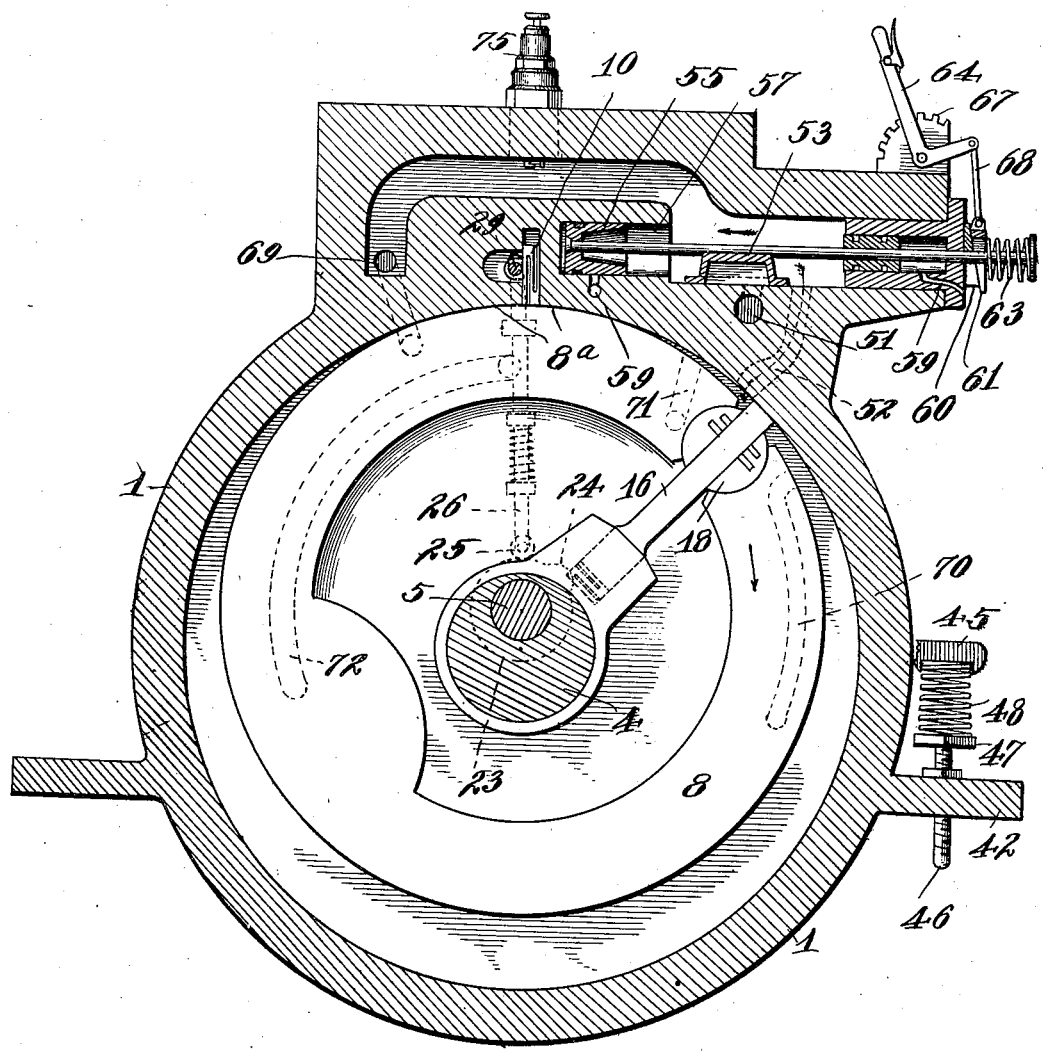

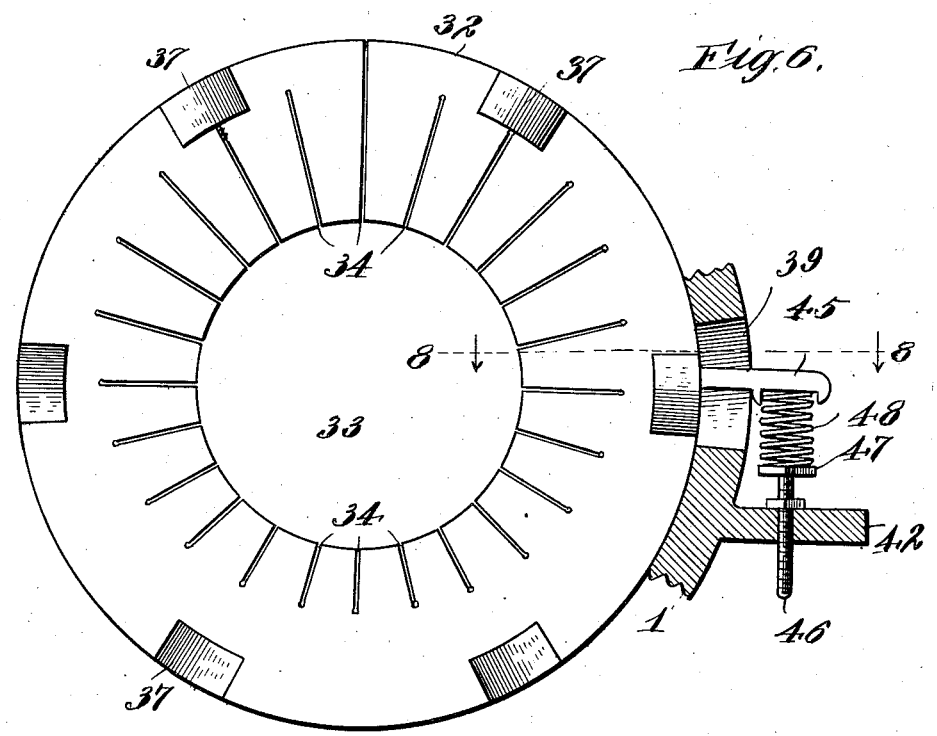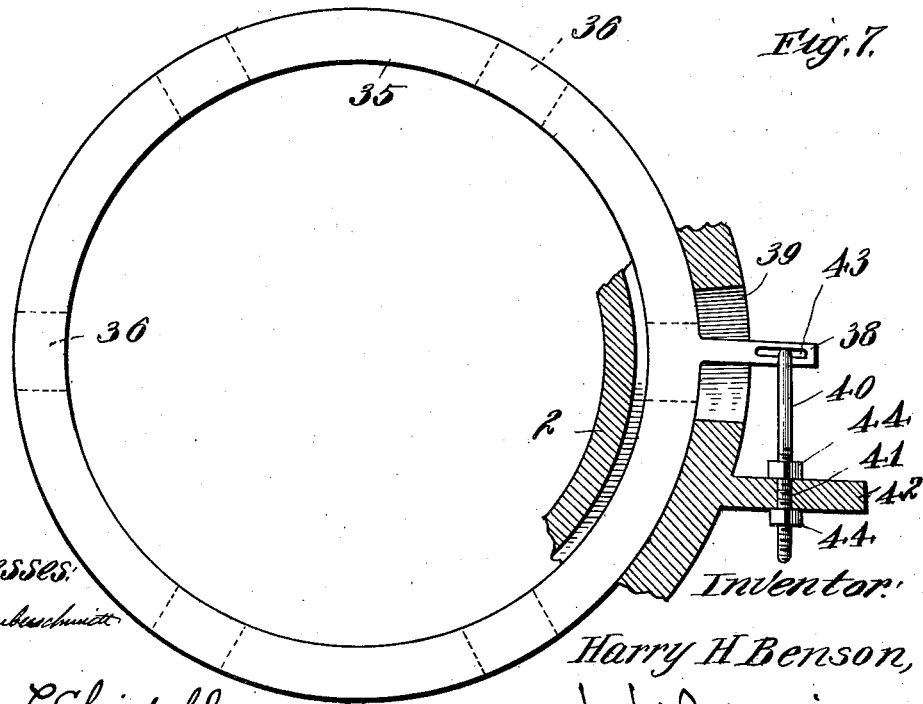

UNITED STATES PATENT OFFICE.

HARRY H. BENSON, OF ROCKFORD, ILLINOIS.

INTERNAL-COMBUSTION ENGINE.

No. 891,394.      Specification of Letters Patent.      Patented June 23, 1908.

Application filed April 15, 1907. Serial No. 368,140.

*To all whom it may concern:*

Be it known that I, HARRY H. BENSON, a citizen of the United States of America, residing at Rockford, in the county of Winnebago and State of Illinois, have invented certain new and useful Improvements in Internal-Combustion Engines, of which the following is a specification.

Figure 1:
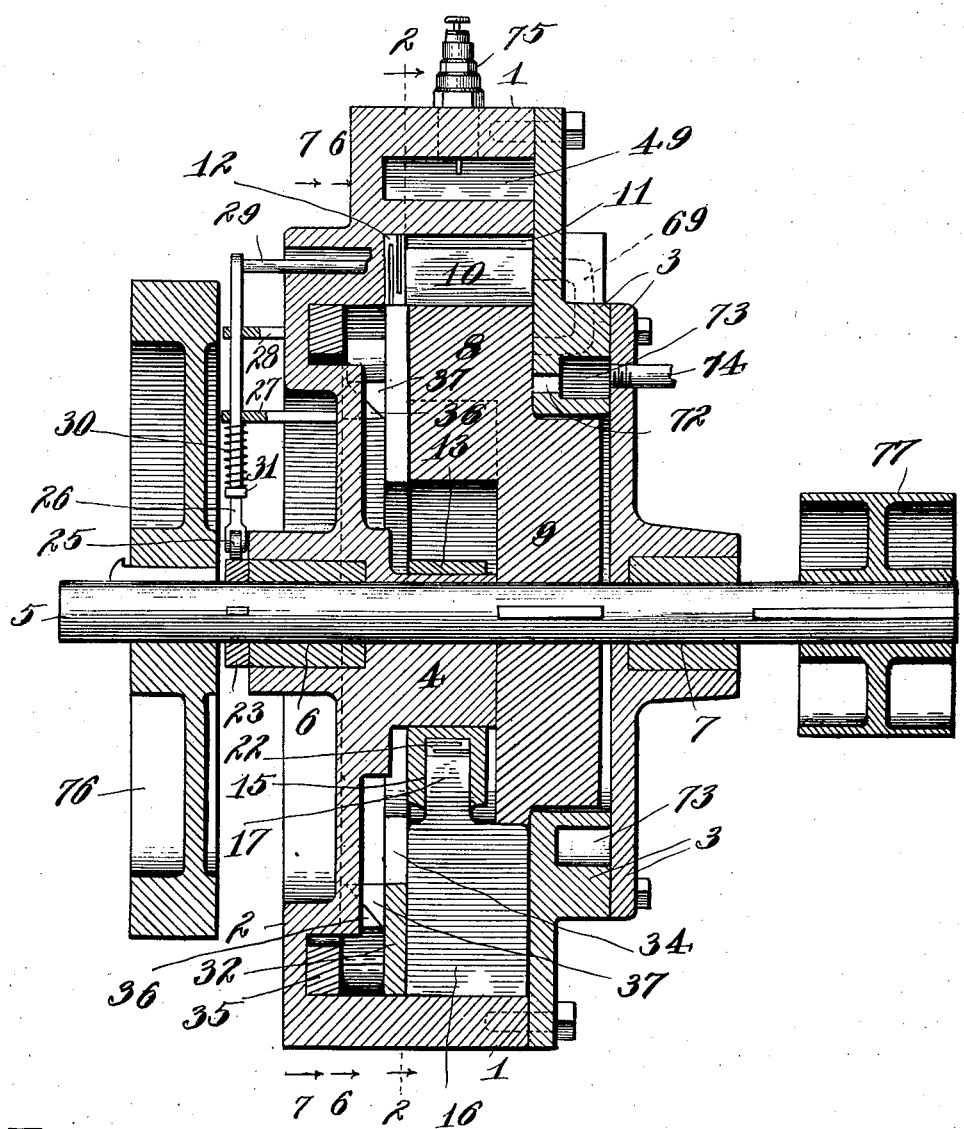
Figure 2:
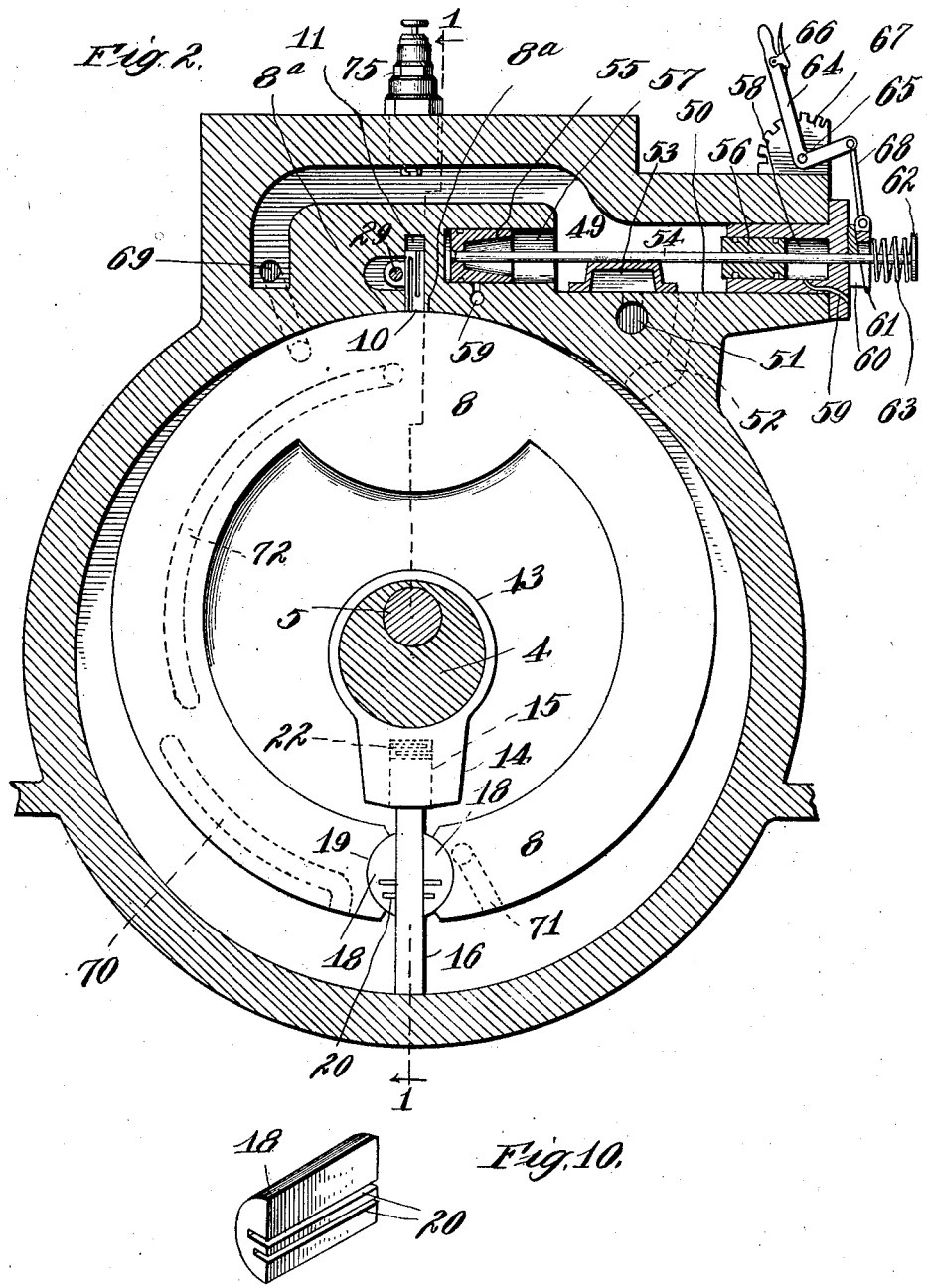
Figure 3:
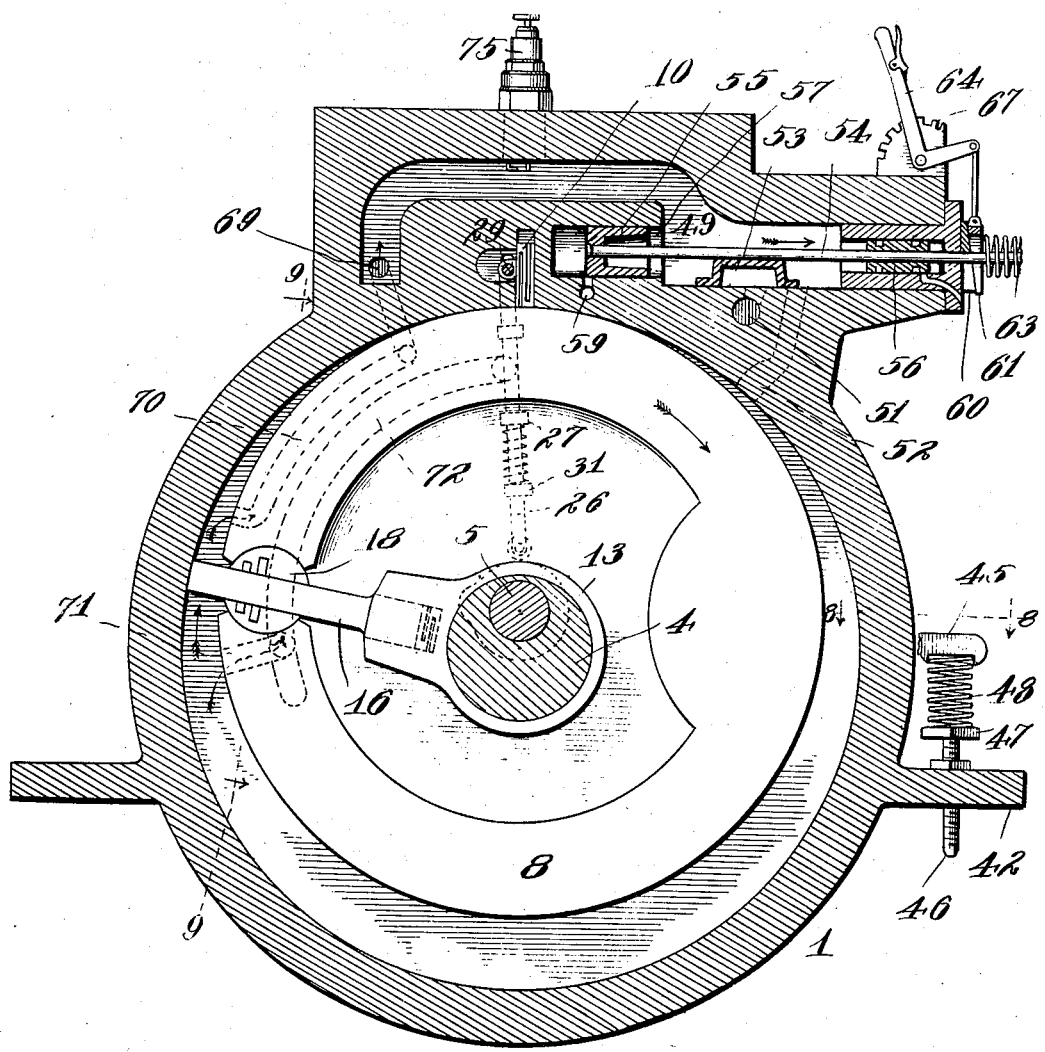

Referring to the accompanying drawings, which form a part of this specification, Figure 1 is a longitudinal partial section, at the dotted line 1 1 in Fig. 2, of the complete machine. Figs. 2, 3, 4 and 5 are transverse sections, at the dotted line 2 2 in Fig. 1, of the complete machine, with parts thereof in different positions in the different views. Fig. 6 is a side elevation of the packing-disk of the machine, looking in the direction of the arrow 6, Fig. 1. Fig. 7 is a side elevation of the packing-disk adjusting ring, looking in the direction of the arrow 7, Fig. 1. Fig. 8 is a sectional detail showing fragments of the packing-disk adjusting-ring in operative engagement through oppositely - inclined lugs thereon, the view being taken in the plane of dotted line 8 8 of Fig. 6. Fig. 9 is a section, at the dotted line 9 9 in Fig. 3, of parts there shown. Fig. 10 is a perspective view of one of the piston-blade holders of the machine.

The object of my invention is the production of an internal combustion rotary engine; and it consists of certain new and useful features of construction and combinations of parts, all as hereinafter fully described and specifically pointed out in the claims.

Like reference characters indicate corresponding parts throughout the several views.

The present embodiment of my invention comprises on engine-cylinder 1 which has preferably an integral end-wall or head 2 and a detachable head 3. From the inner face of the end-wall 2 projects a centrally-arranged transverse circular bearing 4.

5 is a shaft mounted in bearings 6 and 7 in the heads 2 and 3 eccentrically to the longitudinal axis of the cylinder 1 and parallel with and extending through the bearing 4 therein.

8 is a piston mounted by means of a hub 9 fast on the shaft 5, and of less diameter than and within the bore of the cylinder 1 and closely approaching peripheral contact with the concave surface of the latter at one part thereof, as at 8ª.

To prevent the passage of gas between the central portion of the part 8ª and the periphery of the piston 8, I provide means comprising a packing strip 10 slidably mounted in a radial recess 11 formed in the part 8ª, said packing strip extending across and normally contacting the periphery of the piston 8. This packing strip preferably has its edges deeply slotted lengthwise, parallel to its faces, thereby rendering it sufficiently flexible and yielding transversely to prevent its being bound by the walls of its recess 11, while insuring a close contact therewith.

12 is an auxiliary packing strip located in the recess 11 transversely to the strip 10 and between one end of said strip and the adjacent end of said recess. The last mentioned strip is preferably of the same construction as the strip 10 and is sufficiently yielding to allow the latter to expand and contract lengthwise and still leave the same free to slide up and down in its recess 11.

13 is a piston-blade ring rotatably mounted on the bearing 4 and provided with a boss 14 having a radial socket 15 therein.

16 is a piston blade provided with a shank 17 seated in the socket 15. Said blade corresponds in width with the length or thickness of the piston 8 and where it extends through the periphery of said piston it is slidably held between two piston-blade holders 18 (Figs. 2, 9 and 10) seated in a circular opening 19 in the piston 8. In the faces of the holders 18 contacting the piston blade 16 are formed grooves 20 housing packing strips 21 (Fig. 9), similar in construction to the strips 10 and 12. The outer end of the piston blade 16 is held in close contact with the inner periphery of the cylinder 1 by means of a spring 22 interposed between the inner end of the piston shank 17 and the bottom of the socket 15.

To prevent the packing strip 10 from being struck by the rotating piston blade 16, I provide means for moving said strip out of the path of said blade, said means comprising, in the present instance, a collar 23 fast on the shaft 5 and having a cam 24 extending across the periphery of said collar. This collar is contacted by an anti-friction roller 25 carried in the lower end of an arm 26 mounted in guides 27 and 28 fixed to the cylinder head 2. The upper end of the arm 26 is rigidly connected with the packing strip 10 by means of an arm 29. The packing strip 10 is normally held in operative position and the roller 25 constantly maintained in contact with the collar 23 by means of a spring 30 encircling the arm 26 and included between a collar 31 thereon and the guide 27. The cam 24 is fixed upon the shaft 5 in such position that it will elevate the packing strip 10 an instant before the piston blade 16 reaches the recess 11.

The portion of the cylinder 1, which, in operation, contains the gases, to wit, the space between the periphery of the piston 8 and the inner walls of said cylinder, is closed at one end by a packing disk 32 (Figs. 1, 6 and 8) which virtually constitutes one of the cylinder heads. Said packing disk has a central opening 33 therein through which the hub 4 and the shaft 5 extend. From the perimeter of this opening radiate slots 34, one of which extends to the periphery of said disk. The employment of the slots 34 renders the disk 32 sufficiently yielding or compressible radially to prevent it from sticking by reason of expansion during the operation of the engine.

The piston 8 is held in close contact with the cylinder head 3 and the packing disk 32 in close contact with said piston by means comprising, in this instance, an adjusting ring 35 having a plurality of lugs 36 thereon, said lugs having inclined or wedging faces. These lugs are arranged to bear against oppositely-inclined lugs 37 formed upon the packing disk 32.

38 is an arm rigidly connected with the adjusting ring 35 and projecting therefrom outward through a slot 39 in the body of the cylinder 1.

40 is a screw inserted for adjustment through an unthreaded opening 41 in a flange 42 on the cylinder, and having its angular upper end inserted through an opening 43 in the arm 38. Nuts 44 turned on the screw 40 at opposite sides of the flange 42 provide means for causing the lugs 36 on the adjusting ring 35 to coöperate with the lugs 37 on the packing disk 32 to adjust the latter towards or away from the adjacent end of the piston 8 preparatory to operating the latter.

45 is an arm rigidly connected with one of the lugs 37 on the disk 32 and projecting outward therefrom through the slot 39.

46 is a screw provided with a large head 47 and adapted for adjustment through the flange 42.

48 is a spring included between the head 47 of the screw 46 and the free end of the arm 45. The spring 48 acting through the arm 45 normally maintains the plane face of the packing disk 32 in contact with the adjacent end of the piston 8.

49 is the combustion chamber of the engine. In said combustion chamber is formed a valve face 50 upon which opens an induction passage 51 extending from a carbureter, gas producer, or other source of combustible mixture. The combustion chamber 49 is connected with the cylinder 1 by means of an induction passage 52. The induction passage 52 is alternately placed in communication with the induction passage 51 and the combustion chamber 49 by means of a D-valve 53 fixed to a valve rod 54 having pistons 55 and 56 rigidly mounted thereon. Said pistons are slidably mounted in alined cylinders 57 and 58 open to the pressure of the gases in said combustion chamber.

59 are ducts admitting air to the cylinders 57 and 58, said ducts being located in position to be closed by the pistons 55 and 56 before said pistons reach the ends of their travel, whereby a body of air will be trapped in said cylinders to cushion the movements of said pistons.

As shown in the drawings, the piston 55 is somewhat larger in diameter than the piston 56, the unbalanced pressure upon said piston 55 tending to move the D-valve 53 in the direction to place the combustion chamber 49 and the cylinder 1 in communication with each other. The means for moving the D-valve 53 to connect the cylinder 1 with the source of combustible mixture will next be described.

60 (Fig. 2) is a fixed bifurcated wedge bestriding the rod 54.

61 is a movable bifurcated wedge bestriding the rod 54 and disposed with its point toward the heel of the wedge 60 with their adjacent faces in contact.

62 is a disk or collar fastened to the outer and free end of the rod 54.

63 is a coiled spring encircling the rod 54 and included between the wedge 61 and the disk 62.

64 is a bell crank lever pivoted by its angle at 65, and provided with a hand lever 66 terminating at its lower end in a detent adapted to engage a segment rack 67 and lock said lever thereto. A link 68 pivotally connects the free end of the short arm of the lever 64 with the heel of the wedge 61.

The function of the group of devices just described is to regulate the tension of the spring 63 so as to prevent the compressed gas in the combustion chamber 49 from acting upon the piston 55 and opening the valve 53, as in Fig. 2, until such gas has reached a predetermined degree of compression. Should this degree of compression be exceeded, the valve 53 will be opened by the sliding of the piston 55, in the manner already indicated, and the passage 52 will afford an exit into the cylinder 1 for the excess gas, the spring 63 acting immediately thereafter to close said valve.

69 is an eduction passage extending from within the cylinder 1 through the body of the same into the combustion chamber 49, the cylinder end of said passage being normally closed by the piston 8.

70 is an eduction channel formed in one end of the piston 8 in position to register with the cylinder end of the passage 69.

71 is an eduction passage extending through the periphery of the piston 8 and curving thence transversely through one end thereof into position to register with a segment slot 72 extending through the cylinder head 3 and opening into an annular exhaust chamber 73 within said head, said exhaust chamber being open to the atmosphere through the exhaust tube 74.

Any suitable means may be provided for igniting the charge in the combustion chamber 49, as, for example, a spark plug 75.

Upon one end of the shaft 5 is mounted a fly wheel 76. Power is taken from said shaft in any suitable way, as from a drive pulley 77 fast to the other end of the shaft. By extending the shaft 5 through the casing, the piston 8 is held in proper position within the cylinder, and at the same time permitting the use of two fly wheels or one fly wheel and pulley as shown. The cylinder 1 and the combustion chamber 49 may be cooled in any common or preferred way, as by casting a plurality of ribs or fins (not shown) upon the engine structure.

Assuming the combustion chamber 49 to contain a compressed charge of the combustible mixture, the piston 8 to be in the initial position, as shown in Fig. 5, and a quantity of combustible gas to have been previously admitted to the cylinder 1, the operation is as follows: The igniter 75 is operated to explode the charge in the combustion chamber 49. The resulting increase of pressure in said chamber acting upon the piston 55 will drive the latter and the D-valve 53 from the positions shown in Fig. 4 to those shown in Fig. 5. The charge just exploded will then pass through the passage 52, and, acting upon the piston blade 16, will rotate said piston blade and the piston 8 to the position shown in Fig. 3, and thereupon the products of combustion will make their exit through the passage 71, slot 72, annular chamber 73, and exhaust pipe 74. In the meantime the gas in the cylinder 1 in advance of the piston blade 16 will be compressed, and passing into the combustion chamber 49 through the channel 70 and passage 69 will expel the products of combustion from said chamber through the passage 52 into the cylinder 1. When the blade 16 reaches substantially the position shown in Fig. 4, the valve 53 in the combustion chamber 49 under the influence of the springs 63 will assume the position shown in said figure. The piston 8 and the piston blade 16 will continue to rotate by reason of their momentum until they reach the position shown in Fig. 3, during which operation a charge of gas will have been compressed and driven by the blade 16 into the chamber 49, and an additional charge of gas will have been drawn through the passages 51 and 52 into the cylinder 1 ready for compression by the next rotation of the piston 29. When said piston blade 16 again reaches the initial position, the charge of gas in the combustion chamber 44 is ignited, and the cycle of operation repeated.

The packing disk 32 may be adjusted into close and operative contact with the adjacent face of the piston 8 by pressing the arm 38 of the adjusting ring 35 downward the requisite amount, and thereafter maintaining such adjustment by means of the screw 40 and its nuts 44 embracing the flange 42 on the cylinder 1. After the engine has been in operation for a short time its piston 8 will expand with heat until its frictional contact with the disk 32 will be sufficiently great to rotate the latter a slight distance, against the action of the spring 48, the inclined planes on the lugs of the disk 32 and the ring 35 permitting the former, as it turns, to recede towards the latter sufficiently to lessen the friction between the piston 8 and said disk the requisite amount. Whenever the engine cools off sufficiently to cause material contraction of its interior parts, the spring 48 will press the arm 45 upward and therethrough communicate motion to the disk 32, the wedging lugs 37 whereon coöperating with the wedging lugs 36 on the ring 35 will again adjust said disk 32 against the piston 8. Obviously, also, the friction between the packing-disk 32 and the adjacent end of the piston and between the opposite end of the piston and the inner face of the cylinder head 3 may be increased or diminished as desired by increasing or diminishing the tension of the spring 48 by means of the screw 46.

I desire it to be understood that in the practical manufacture of this engine I do not regard myself as limited to the precise construction herein described, inasmuch as many departures from said construction may be made within the scope of the invention.

While applicant has described his improved engine as an internal combustion engine, it is to be understood that the claims are not thus limited.

I claim as my invention:

1. In an engine, in combination, a casing forming a cylinder, a shaft extending through the casing eccentrically with the bore of the cylinder, a disk piston located within the cylinder and fixedly connected with the shaft, a hub extending inward from the casing and located eccentrically around the shaft, and a blade rotatably mounted on the hub and contacting with the inner periphery of the cylinder and extending through a portion of said piston.

2. In an engine, in combination, a casing forming a cylinder, a shaft extending through the casing eccentrically with the bore of the cylinder, a disk piston located within the cylinder and fixedly connected with the shaft, a hub extending inward from the casing and located eccentrically around the shaft, a blade rotatably mounted on the hub and contacting with the inner periphery of the cylinder and extending through a portion of said piston, a pair of blade holders movably mounted in said piston at opposite sides of the blade, and a packing located in a groove in the cylinder and contacting with the periphery of the piston.

3. In an engine, in combination, a cylinder, a piston within the cylinder, a chamber adapted to communicate with the cylinder, a rod, a valve movable with the rod controlling the communication between the cylinder and chamber, two pistons connected to the rod, one located each side of the valve, and a spring exerting its force on the rod.

4. In an engine, in combination, a cylinder, a piston within the cylinder, a chamber adapted to communicate with the cylinder, a rod, a valve movable with the rod for controlling the communication between the cylinder and chamber, two pistons connected to the rod, one located each side of the valve, a spring exerting its force on the rod, and means for varying the spring tension.

5. In an engine, in combination, a cylinder, a piston within the cylinder, a chamber adapted to communicate with the cylinder, a rod, a valve movable with the rod for controlling the communication between the cylinder and chamber, two pistons connected to the rod, one located each side of the valve, a spring exerting its force on the rod, a toothed segment, a hand lever having an engagement with the toothed segment, and means movable by the hand lever for varying the spring tension.

6. In an engine, in combination, a cylinder, a piston within the cylinder, a chamber adapted to communicate with the cylinder, a rod, a valve movable with the rod for controlling the communication between the cylinder and chamber, two pistons connected to the rod, one located each side of the valve, a spring exerting its force on the rod, the casing formed with an inclined surface adjacent to the rod, and a movable wedge located in contact with the inclined surface, and in contact with the spring by means of which the spring tension may be varied.

7. In an engine, in combination, a cylinder having a fixed head, a piston rotatably mounted in the cylinder, a packing disk contacting one end of the piston, the packing disk capable of a combined axial movement and a movement toward and from the piston, said movement being imparted to the packing in one direction by frictional contact with the piston and mechanical means for imparting the movements to the packing in the opposite direction.

8. In an engine, in combination, a cylinder having a fixed head, a piston rotatably mounted in the cylinder, a packing disk contacting with one end of the piston and provided with an incline surface, a ring provided with an incline surface and adapted to contact with the first mentioned incline surface, means for holding the packing disk yieldingly in contact with the piston, and means for adjusting the ring axially.

9. In an engine, in combination, a cylinder; a piston rotatably mounted in said cylinder; a packing disk contacting one end of said piston; a wedge-shape lug on said packing disk; a wedge-shape lug adapted to coöperate with said first-mentioned lug; means for adjusting the position of said second-mentioned lug; and means tending to hold said lugs in contact.

10. In an engine, in combination, a cylinder; a piston rotatably mounted in said cylinder; a packing disk contacting one end of said piston; a plurality of wedge-shape lugs on said packing disk; a ring having a plurality of wedge-shape lugs adapted to coact with said first-mentioned lugs; means for adjusting the position of said ring; and a spring tending to rotate said disk and move said disk longitudinally into contact with said piston.

11. In an engine, in combination, a cylinder, a piston rotatably mounted in said cylinder, a blade rotatably mounted in the cylinder and movable by the piston, a packing supported by the cylinder and contacting with the piston at one point, and means for moving the packing at the time the blade passes it.

HARRY H. BENSON.

Witnesses:
R. F. LOCKE,
EARL F. WHITMORE.